(12) United States Patent
Higdon et al.

(10) Patent No.: US 12,401,562 B1
(45) Date of Patent: Aug. 26, 2025

(54) METHODS AND SYSTEMS FOR DYNAMIC ALARM THROTTLING AND ROUTING

(71) Applicant: T-Mobile Innovations LLC, Overland Park, KS (US)

(72) Inventors: Thomas Higdon, Bradenton, FL (US); Talley Kennedy, Olathe, KS (US)

(73) Assignee: T-Mobile Innovations LLC, Overland Park, KS (US)

( * ) Notice: Subject to any disclaimer, the term of this patent is extended or adjusted under 35 U.S.C. 154(b) by 0 days.

(21) Appl. No.: 18/632,219

(22) Filed: Apr. 10, 2024

(51) Int. Cl.
*H04L 41/0604* (2022.01)

(52) U.S. Cl.
CPC ................................. *H04L 41/0604* (2013.01)

(58) Field of Classification Search
CPC . H04L 41/06; H04L 41/0604; H04L 41/0609; H04L 41/0613; H04L 41/0627; H04L 41/0686
See application file for complete search history.

(56) References Cited

U.S. PATENT DOCUMENTS

| | | | | |
|---|---|---|---|---|
| 6,239,699 B1* | 5/2001 | Ronnen | ............... | H04L 41/0622 370/242 |
| 6,694,364 B1* | 2/2004 | Du | ...................... | H04L 41/0631 714/48 |
| 2006/0233311 A1* | 10/2006 | Adams, Jr. | .......... | H04L 41/5074 379/21 |
| 2007/0222576 A1* | 9/2007 | Miller | ................. | H04L 41/0609 340/506 |
| 2010/0052924 A1* | 3/2010 | Bajpay | ................ | H04L 41/0613 340/635 |
| 2010/0157812 A1* | 6/2010 | Blocker | .............. | H04L 41/0631 370/242 |
| 2013/0113616 A1* | 5/2013 | Pinel | .................. | G06Q 10/0631 340/501 |
| 2018/0150758 A1* | 5/2018 | Niininen | ................. | H04L 41/16 |
| 2021/0366268 A1* | 11/2021 | Jain | ...................... | H04L 41/0627 |
| 2022/0294767 A1* | 9/2022 | Scali | ..................... | H04L 67/141 |
| 2023/0105150 A1* | 4/2023 | Zuchlewski | ........ | H04L 41/0627 719/318 |
| 2024/0113932 A1* | 4/2024 | Castrogiovanni | ... | H04L 41/0604 |

OTHER PUBLICATIONS

Bhukar, Karan, et al. "Dynamic Alert Suppression Policy for Noise Reduction in AIOps." Proceedings of the 46th International Conference on Software Engineering: Software Engineering in Practice. 2024. (Year: 2024).*

* cited by examiner

*Primary Examiner* — Vivek Srivastava
*Assistant Examiner* — William C McBeth

(57) ABSTRACT

A method comprises determining, by an alarm management system, that an alarm parameter exceeds a threshold value, transmitting, by the alarm management system, a throttle alarm to an incident reporting application in the communication network, in which the throttle alarm indicates that the second alarms describing the common incident will be throttled at the alarm management system for the throttle period, storing, by the throttle application, second alarms describing a common incident at a data store accessible by the alarm management system during a throttle period instead of forwarding the second alarms to a processing entity, transmitting, by the alarm management system, at pre-defined time intervals during the throttle period, an interval alarm report, and transmitting, by the incident management system to an incident reporting system, a throttled alarm report.

20 Claims, 9 Drawing Sheets

METHODS AND SYSTEMS FOR DYNAMIC ALARM THROTTLING AND ROUTING

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Communication network operators build systems and tools to monitor their networks, to identify network elements (NEs) that need maintenance, to assign maintenance tasks to personnel, and to fix NEs. Operational support systems (OSSs) may be provided by vendors of NEs to monitor and maintain their products. When trouble occurs in NEs, the OSS and/or the NEs may generate an alarm notification. An incident management system may be provided by the network operator to track incident reports which may be assigned to employees to resolve one or more pending alarms. A network operation center (NOC) may provide a variety of workstations and tools for NOC personnel to monitor alarms, close incident reports, and maintain the network as a whole. It is understood that operating and maintaining a nationwide communication network comprising tens of thousands of cell sites and other NEs is very complicated.

SUMMARY

In an embodiment, method for throttling alarms received in an incident management system implemented in a communication network is disclosed. The method comprises receiving, by an alarm management application implemented by an alarm management system of the communication network, a plurality of first alarms from a network element in a radio access network of the communication network, in which the first alarms are forwarded through the incident management system for resolution, and receiving, by the alarm management application, one or more messages indicating that a subset of the first alarms have self-resolved within a predefined time period without intervention, in which each alarm in the subset of the first alarms describe a common incident occurring at the network element. The method further comprises determining, by the alarm management application, an alarm parameter of the network element based on a first quantity of the first alarms received from the network element during the predefined time period and a second quantity of the subset of the first alarms that have self-resolved during the predefined time period. After determining, by the alarm management application, that the alarm parameter exceeds a threshold value, the method further comprises receiving, by the alarm management application, a plurality of second alarms from the network element during a throttle period, in which the second alarms each describe the common incident occurring at the network element, storing, by a throttle application implemented by the alarm management system, the second alarms at a data store accessible by the alarm management system during the throttle period instead of forwarding the second alarms to a processing entity, and transmitting, by the throttle application, at pre-defined time intervals during the throttle period, an interval alarm report including at least one of a summary of the second alarms stored at the data store during the throttle period, a current state of one or more of the second alarms, or a parameter associated with one or more of the second alarms. When the throttle period ends, the method further comprises transmitting, by the throttle application to an incident reporting application implemented in an incident reporting system of the communication network, a throttled alarm report including data describing one or more of the second alarms that are still active at the network element for generation of an incident report describing the common incident.

In another embodiment, a method for throttling alarms received in an incident management system implemented in a communication network is disclosed. The method comprises obtaining, by an alarm management application implemented by an alarm management system of the communication network, an alarm parameter of a network element based on a first quantity of first alarms received from the network element during a predefined time period and a second quantity of a subset of the first alarms that have self-resolved during the predefined time period. After determining, by the alarm management application, that the alarm parameter exceeds a threshold value, the method further comprises receiving, by the alarm management application, a plurality of second alarms from the network element during a throttle period, in which the second alarms each describe a common incident occurring at the network element, transmitting, by a throttle application implemented by the alarm management system, a throttle alarm to an incident reporting application in the communication network, in which the throttle alarm indicates that the second alarms describing the common incident will be throttled at the alarm management system for the throttle period, storing, by the throttle application, the second alarms at a data store accessible by the alarm management system during the throttle period instead of forwarding the second alarms to a processing entity, and transmitting, by the throttle application, at pre-defined time intervals during the throttle period, an interval alarm report including at least one of a summary of second alarms stored at the data store during the throttle period, a current state of one or more of the second alarms, or a parameter associated with one or more of the second alarms. When the throttle period ends, the method further comprises transmitting, by the throttle application to an incident reporting application implemented in the incident reporting system, a throttled alarm report including data describing one or more of the second alarms that are still active at the network element for generation of an incident report describing the common incident. This may further comprise instructing, by the incident reporting application, a corrective action to be performed at the network element in response to the throttled alarm report.

In yet another embodiment, a communication network is disclosed. The communication network comprises an alarm management system comprising one or more processors, one or more non-transitory memories, an alarm management application, and a throttle application. The alarm management application instructions stored at the one or more non-transitory memories, which when executed by the one or more processors, causes the alarm management application to obtain an alarm parameter of a network element based on a first quantity of first alarms received from the network element during a predefined time period and a second quantity of a subset of the first alarms that have self-resolved during the predefined time period, determine that the alarm parameter exceeds a threshold value, and receive a plurality of second alarms from the network element during a throttle period, wherein the second alarms each describe a common incident occurring at the network element. The throttle application comprises instructions stored at the one or more non-transitory memories, which when executed by the one or more processors transmit a throttle alarm to an incident reporting application in the communication network, wherein the throttle alarm indicates that the second alarms describing the common incident are to be throttled at the alarm management system for the throttle period, store the second alarms at a data store accessible by the alarm management system during the throttle period instead of forwarding the second alarms to a processing entity, transmit at pre-defined time intervals during the throttle period, an interval alarm report including at least one of a summary of the second alarms stored at the data store during the throttle period, a current state of one or more of the second alarms, or a parameter associated with one or more of the second alarms, and transmit, to an incident reporting application implemented in the incident reporting system, a throttled alarm report including data describing one or more of the second alarms that are still active at the network element for generation of an incident report describing the common incident.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
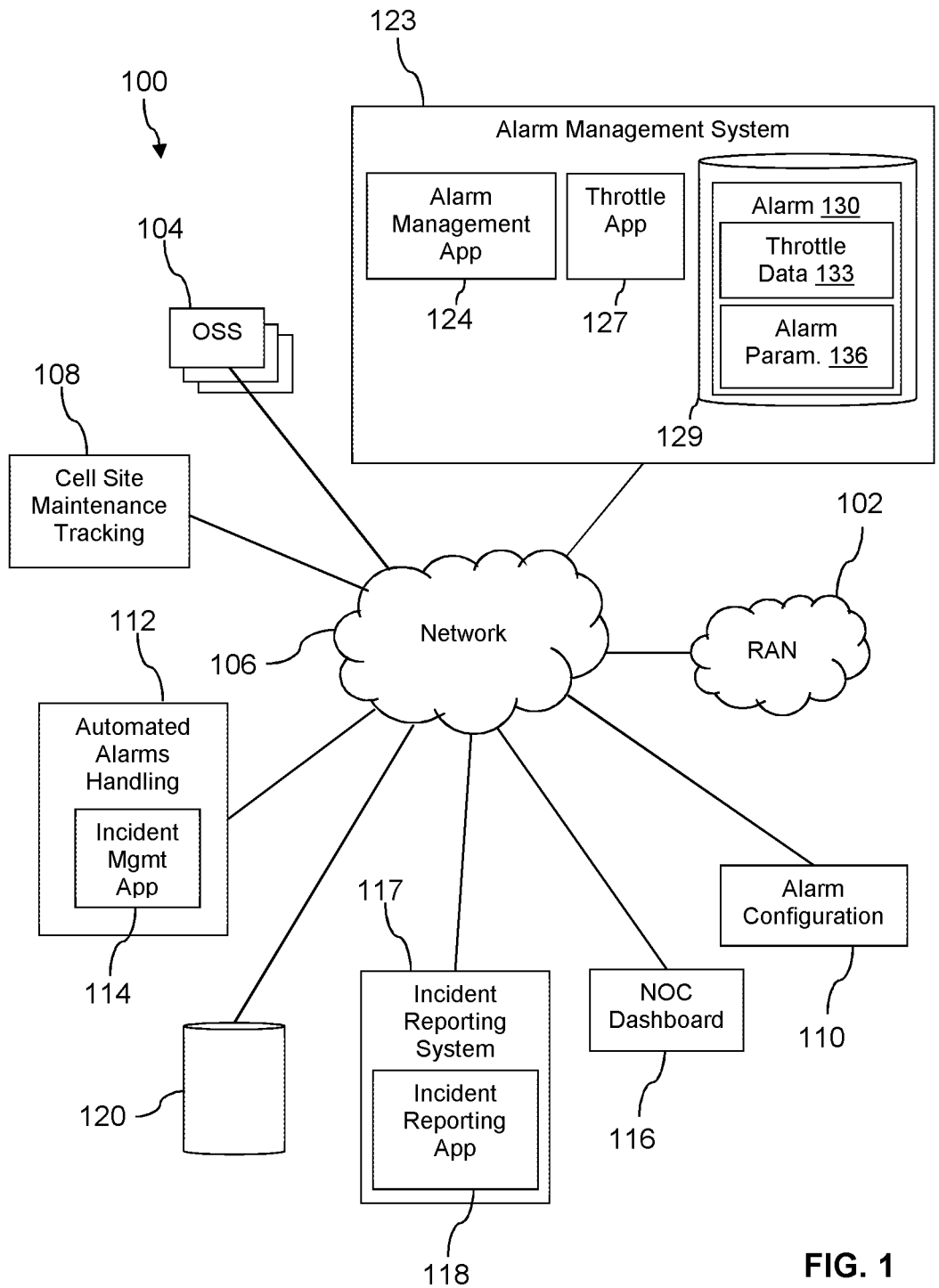
FIG. 1 is a block diagram of a communication network configured to dynamically throttle alarms received from network elements (NEs) in the communication network according to various embodiments of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

A communications network may include one or more radio access networks (RANs), each including network elements (NEs) used to transport traffic between a source and destination. The NEs may include, for example, routers, virtual private networks (VPNs), cell sites, towers, macro/micro cells, etc. The communication network may also include the incident management system that creates and tracks incident reports to resolve incidents occurring at the NEs. The incident management system may include, for example, an alarm management application, one or more OSSs, central monitoring station(s), an incident reporting application, an incident management application, and/or an automated system, that work together to monitor and resolve hardware and software incidents (e.g., failures and faults) that may occur at the NEs in the system. For example, different types of incidents may occur at each of the NEs, and the different types of incidents may trigger alarms that are forwarded through the alarm management application, to the OSS, and then propagated to an incident reporting application.

For example, the alarm management application may receive the alarms from the NEs in the RAN and perform pre-processing steps on the alarms before forwarding the alarms through the OSS to the incident reporting application. The OSS may be responsible for further processing the alarms and forwarding the alarms to the incident reporting application and/or the NOC. The incident reporting application may be responsible for automatically or manually generating an incident report detailing the incident that caused the alarm. The incident reporting application may create the incident report and send the incident report to an incident management application, which may be responsible for triaging the incident report and ensuring that the incident report is sent to a processing entity for resolution or remediation of the incident. The processing entity responsible for resolving the incident may be the automated system, a maintenance technician, or a NOC operator operating a NOC workstation. The automated system may receive an instruction from the incident management system to programmatically perform certain steps in an attempt to resolve or remediate the incident described in the incident report.

For example, NEs such as cell sites in a RAN may be susceptible to different types of incidents caused by hardware and software issues, failures, or problems. The NEs in the RAN, or an application communicatively coupled to the NEs, may be programmed to detect these incidents or conditions leading up to these incidents and trigger an alarm accordingly. The alarms may be forwarded to the alarm management application for pre-processing, then through the OSS, and then to the incident reporting application. The incident reporting application may generate the incident report in response to receiving the alarm based on the incident that triggered the alarm. The incident management application may forward the incident report to the processing entity, such that the entity may perform the steps to attempt to resolve the incident. As used herein, the term "resolution" or "resolved" may refer to the process of correcting or remediating the underlying incident that triggered the alarm and closing the incident or incident report.

However, in some cases, the alarm management application may detect certain types of abnormalities in the alarms received from the NEs in the RAN. For example, sometimes an NE may trigger an alarm, and within seconds (e.g., 60 second), the alarm may be cleared or resolved without intervention (i.e., the incident triggering the alarm may suddenly stop). Sometimes, the alarm management application may receive a high rate of these alarms that quickly resolve without intervention (hereinafter referred to as "self-resolved alarms"). For example, the alarm management application may receive hundreds of alarms from an NE and begin performing the pre-processing operations on the alarms and may even begin forwarding the alarms to the OSS. Then, within less than a minute, the alarm management application may receive hundreds of messages or notifications from the NE indicating that the alarms have self-resolved. However, the alarms may have already been forwarded to the OSS at this point, and in some cases, the incident reporting application may have already created corresponding incident reports based on the alarms.

This may give rise to various technical problems, primarily due to the fact that the alarm management application may be configured to immediately process and forward received alarms to the OSS for resolution, before any self-resolution message is received. Immediately forwarding alarms through the network, without considering the likelihood of the potential self-resolution of the alarms, may unnecessarily overload the network and processing capacity of the incident management system. Particularly in cases where there are hundreds or thousands of self-resolved alarms occurring in the network, the forwarding of the alarms and messages leads to an unnecessary load of incorrect data traffic flowing through the network. This consequently may result in the creation of numerous invalid incident reports created incorrectly or unnecessarily-again heavily congesting the network. Therefore, the technical problem described above involves managing flooding alarms (with rapid clears) overwhelming the capacity of the network and processors.

The present disclosure teaches a technical solution to the foregoing technical problem related to network operations and maintenance by implementing methods and systems for dynamically throttling alarms at the alarm management system based on trends related to self-resolved alarms received from a NE in the RAN. The embodiments disclosed herein are directed to throttling the original alarms, creating summations (e.g., reports) to forward to the incident reporting/management application and/or processing entity, and forwarding some portion of the actual original alarm notices (set and clear). As disclosed herein, this may all be performed while preserving key information about the alarms in a more digestible form for action and analysis.

In various embodiments, the alarm management system may include an alarm management application and a throttle application. The alarm management application may capture the trend of all of the alarms received from a NE in the RAN, and also capture a trend of all of the self-resolved alarms received from a NE in the RAN to obtain an alarm parameter. The alarm parameter may be compared with a threshold to determine whether to throttle the alarms (e.g., store alarms in a data store/cache accessible to the alarm management application), instead of forwarding the alarms immediately through the network.

In this way, the embodiments disclosed herein determine when to begin caching certain types of alarms received from the NE instead of congesting the network with the alarms, and this determination is based on various factors, such as, the general alarm behavior of the NE, a history of self-resolved alarms from the NE within a period of time, and a dynamic threshold created for the type of alarm and the NE. By caching the alarms that may be likely to self-resolve instead of immediately forwarding these alarms, the network traffic and processing resources that otherwise would have been used to forward these alarms may be greatly reduced, thus increasing network and processing capacity at the network.

In an embodiment, the alarm management application may receive alarms from a NE in the RAN, and the alarm management application may gather data from the alarms to determine rates of different types of alarms coming from the NE and rates of self-resolved alarms coming from the NE. For example, the alarm management application may receive alarms from a NE in the RAN. The alarms may come from multiple different NEs in the RAN and may relate to different incidents occurring at the NEs. The alarm management application may forward these alarms to a processing entity (e.g., the incident reporting application, the NOC, and/or a maintenance technician) via the OSSs for creation of an incident report corresponding to each alarm to resolve the incident.

However, within a predefined period of time, the alarm management application may also receive messages from a NE indicating that at least a subset of the alarms of a particular type received from the NE have self-resolved at the NE without intervention from a processing entity. The alarms in the subset may all describe a common incident at the NE. In some cases, the alarm management application may transmit an update regarding each alarm in the subset to the processing entity, in which the update indicates the self-resolution of the corresponding alarm. The processing entity may use the update to determine whether to drop an incident report or instruct the NOC or maintenance technician to take a certain action based on the update.

In an embodiment, the alarm management application may obtain data regarding the received alarms and self-solutions messages from the NE to determine various metrics related to the received alarms and self-solutions messages and to determine an alarm parameter of the NE. For example, the alarm management application may determine a quantity of the alarms (relating to a common incident) received by the NE within a predefined period of time, and then determine a quantity of the alarms that later self-resolve (e.g., based on received messages indicating that the alarms self-resolved) within the same predefined period of time. The alarm management application may use the determined quantities to determine a rate of alarms received from the NE within the predefined period of time and a rate of self-resolved alarms received from the NE within the predefined period of time. The alarm management application may determine an alarm parameter based on the determined quantities and/or rates. For example, the alarm parameter may be a ratio of the rate of self-resolved alarms to the rate of alarms received from the NE in the predefined period of time.

The alarm management application may then compare the alarm parameter with a threshold defined for the type of self-resolved alarms and/or the NE. In some cases, the threshold may be based on various factors, such as, for example, the determined quantities and/or rates, the predefined period of time, a type of the self-resolved alarms, the common incident, etc. The threshold may also be set to a default percentage or proportion for the NE and/or based on a type of the self-resolved alarms. For example, the threshold may be set to 50 percent (%).

For example, the alarm parameter may be a percentage of self-resolved alarms at the NE, which may be based on the rate of self-resolved alarms and the rate of alarms received from the NE, and the threshold may also be a percentage. In this case, the alarm management application may compare the alarm parameter percentage with the threshold percentage. When the alarm parameter percentage exceeds the threshold percentage, the alarm management application may determine that new alarms (sometimes referred to herein as "second alarms") received from the NE during a throttle period are to be throttled (e.g., stored or cached) in a data store instead of being immediately forwarded to a processing entity. The alarm management application may determine the throttle period based on various factors, such as, for example, the determined quantities and/or rates, the period of time, the types of self-resolved alarms, the common incident, a network impact of the common incident, etc. The throttle period may also be set to a default period of time (e.g., at least one hour).

During the throttle period, the alarm management application may receive new alarms from the NE, and the newly received alarms may also each describe the common incident at the NE. The alarm management application may determine that the newly received alarms are to be throttled instead of being immediately forwarded to the processing entity. The alarm management application may also receive other alarms from the NE that do not relate back to the common incident, but instead describe another incident at the NE that may not necessarily have a history of self-resolving. The alarm management application may forward the other alarms immediately to the processing entity via the OSS, while the alarm management application throttles the newly received alarms related to the common incident, as further described herein.

To this end, a throttle application may throttle the newly received alarms by storing the alarms in a local data store, such as a cache or other short-term memory, at or accessible to the alarm management application, at least for the throttle period. The throttle application may add throttle data to each alarm before storing the alarm in the data store. The throttle data may describe, for example, the throttle period, alarm parameter, threshold, or any other data describing the throttling of the alarms.

The throttle application may then generate a throttle alarm indicating that these newly received alarms describing the common incident are being throttled instead of forwarded. The throttle alarm may describe, for example, the common incident and the throttle period. The throttle alarm may also indicate the data store in which the alarms are being cached during throttling, a duration that the alarms will be cached for, a reason behind throttling the alarms (e.g., an indication that the alarm parameter is greater than a threshold), the alarm parameter, the threshold, the predefined time period, etc. The throttle application may then send the throttle alarm to the processing entity, for the processing entity to be aware that certain types of alarms are being throttled because the alarms are repeatedly self-resolving.

The throttle application may also periodically generate, for example, at predefined time intervals during the throttle period, an interval alarm report. For example, the predefined time intervals may occur every few minutes (e.g., 2, 3, or 5 minutes) during the throttle period. The interval alarm report may include information describing the alarms being stored at the data store (e.g., also referred to herein as throttled alarms). For example, the interval alarm report may include a summary of the throttled alarms, a current state of each of the throttled alarms (e.g., active alarm state or temporarily/permanently resolved state), a parameter associated with the throttled alarm (e.g., a priority or severity of the throttled alarm). The interval alarm report may also describe trends that may be determined based on the throttled alarms. For example, the trends may indicate whether a rate of self-resolved alarms is decreasing or increasing over the predefined interval(s), whether a quantity of self-resolved alarms is decreasing or increasing over the predefined interval(s), whether the alarm appears to no longer be switching between active state and self-resolved state (e.g., either remains active or appears to be permanently resolved), etc. The throttle application may forward the interval alarm report to the processing entity. The processing entity may keep track of the data in the interval alarm report, store the data to a data store, and/or perform certain resolution tasks or actions at the NE if warranted.

The throttle application may continue generating interval alarm reports at each predefined time interval until, for example, the throttle application determines that the throttle period has ended or terminated. If so, the throttle application may generate a throttled alarm report comprising an overview of the throttled alarms over the course of the entire throttle period. The throttled alarm report may include various types of data, such as, for example, data regarding each throttled alarm (e.g., timestamp, duration between alarm and self-resolution message, incident data, alarm parameter, threshold, predefined time period, etc.). in some cases, the throttled alarm report may include minimal data regarding pairings of alarms and self-resolutions that appear to be fully resolved (i.e., when the alarm management system may no longer be receiving the alarm from the NE). The throttled alarm report may also include alarm data specifically describing the active alarms that are still pending at the NE and may be resolved based on the creation of an incident report generated by the incident reporting system. The throttle application may transmit the throttled alarm report to the processing entity.

Based on the data including throttle alarm, interval alarm report, and/or the throttled alarm report, the processing entity may perform resolution tasks and actions at least with regard to the alarms that remain pending after the throttle period. For example, the throttle alarm, interval alarm report, and/or the throttled alarm report may each include certain types of alarms are being throttled because the alarms are repeatedly self-resolving. The resolution tasks and/or actions performed in response to the throttle alarm, interval alarm report, and/or the throttled alarm may include, for example, automatically performing one or more different types of reset operations the affected NEs, reporting the throttled alarms and associated data to the NOC, report the throttled alarms and associated data directly to a maintenance technician and/or field technician, etc.

For example, the incident reporting application may generate one or more incident reports based on the throttled alarm report, in a manner similar to how other incident reports are generated, except that the incident report may include a flag or some other indication that the incident report is based on a throttled alarm. In other words, the incident report may include an indication that the triggering alarm that has a history of self-resolving, to an extent that the alarm was throttled for a throttle period. The NOC and/or a maintenance technician may take additional or other action based on the throttled alarm report and/or the incident report. For example, the NOC may monitor the NE for a longer period of time to determine a root cause of the incident, and then instruct the maintenance technician to remediate the root cause of the incident. Alternatively, the NOC may request a maintenance technician to perform maintenance at the NE to identify and remediate the root cause of the incident manually. Alternatively, an automated system may perform one or more pre-determined steps at the NE in an attempt to identify the root cause of the incident, and perform additional automated pre-defined steps to remediate the incident or instruct the NOC/maintenance technician to manually perform steps to remediate the incident.

Therefore, the embodiments disclosed herein are generally directed to caching detected alarms from a NE that are repeatedly self-resolving, instead of immediately forwarding the alarms to the processing entity. As such, the embodiments disclosed herein greatly reduce the processing and networking load that would have otherwise been used to immediately forward all the alarms, that would later be self-resolved. To this end, the embodiments disclosed herein improve the functioning of the alarm management system and incident management system as a whole (e.g., computer systems) by reducing the network traffic and processing load while increasing network capacity. Thus, the embodiments disclosed herein have the technical effect of increasing processing and network capacity in the systems disclosed herein, for the technical purpose of resolving incidents at NEs in a RAN in an efficient and effective manner.

Turning now to FIG. 1, a communication network 100 is described. In an embodiment, the communication network 100 comprises a radio access network (RAN) 102, a plurality of operational support systems (OSSs) 104, a network 106, a cell site maintenance tracking system 108, an alarms configuration system 110, an automated alarms handling system 112 (also sometimes referred to herein as the "automated system 112") that executes an incident management application 114, a network operation center (NOC) dashboard system 116, an incident reporting system 117 that executes an incident reporting application 118, an alarm management system 123, and a data store 120. In an embodiment, communication network 100 may be a telecommunications carrier network comprising the RAN 102. The incident management system may include the RAN 102, the OSSs 104, the cell site tracking system 108, the alarms configuration system 110, the automated alarms handling system 112, the NOC dashboard system 116, the incident reporting system 117, the alarm management system 123, and the data store 120.

The RAN 102 comprises a plurality of NEs, such as, for example, cell sites and backhaul equipment. In an embodiment, the RAN 102 comprises tens of thousands or even hundreds of thousands of cell sites. The cell sites may comprise electronic equipment and radio equipment including antennas. The cell sites may be associated with towers or buildings on which the antennas may be mounted. The cell sites may comprise a cell site router (CSR) that couples to a backhaul link from the cell sites to the network 106. The cell sites may provide wireless links to user equipment (e.g., mobile phones, smart phones, personal digital assistants, laptop computers, tablet computers, notebook computers, wearable computers, headset computers) according to a 5G, a long-term evolution (LTE), code division multiple access (CDMA), or a global system for mobile communications (GSM) telecommunication protocol. In an embodiment, the OSSs 104 comprise tens or even hundreds of OSSs. The network 106 comprises one or more public networks, one or more private networks, or a combination thereof. The RAN 102 may from some points of view be considered to be part of the network 106 but is illustrated separately in FIG. 1 to promote improved description of the network 100.

The cell site maintenance tracking system 108 is a system implemented by one or more computers. Computers are discussed further hereinafter. The cell site maintenance tracking system 108 is used to track maintenance activities on NEs (e.g., cell site equipment, routers, gateways, and other network equipment). When a NE is in maintenance, alarms that may occur on the NE may be suppressed, to avoid unnecessarily opening incident reports related to such alarms that may be generated because of unusual conditions the equipment may undergo pursuant to the maintenance activity. When a maintenance action is completed, maintenance personnel may be expected to check and clear all alarms pending on the subject NE before the end of the time scheduled for the maintenance activity.

The alarm configuration system 110 is a system implemented by one or more computers. The alarm configuration system 110 allows users to define rules and instructions for handling alarms, for example rules for automatic processing of alarms by the automated alarms handling system 112. The alarm configuration system 110 may define alarm configuration rules for when an alarm leads to automatic generation of an incident report, as described herein.

The alarm management system 123 is a system implemented by one or more computers. The alarm management system 123 may include an alarm management application 124 that receives alarms from NEs in the RAN 102 and performs pre-processing operations on the alarms before forwarding the alarms to the OSSs 104. The received alarms may include various types of data, such as, for example, an event type describing the nature of the incident, a location of the NE, a timestamp of the incident, a security level of the incident (e.g., critical, major, minor), and other data describing the incident triggering the alarm. The alarm management application 124 may perform various pre-processing operations on the received alarms, such as, for example, filtering, aggregation, correlations, prioritization, enrichment, normalization, suppression, and/or other types of operations. The alarm management application 124 may then forward the alarms to the OSSs 104, which may then store the alarms in the data store 120.

The NOC dashboard 116 can access the alarms stored in the data store 120 and provide a list of alarms on a display screen used by NOC personnel. NOC personnel can manually open incident reports on these alarms. In an embodiment, the NOC dashboard 116 provides a system that NOC personnel can use to monitor health of a carrier network (e.g., monitor the RAN 102 and at least portions of the network 106), to monitor alarms, to drill down to get more details on alarms and on NE status, to review incident reports, and to take corrective actions to restore NEs to normal operational status. The NOC dashboard 116 may interact with the data store 129, with the cell site maintenance tracking system 108, the OSSs 104, the RAN 102, and other systems. NOC personnel can use the NOC dashboard 116 to manually create incident reports based on alarms reviewed in a user interface of the NOC dashboard 116. The NOC dashboard 116 may be implemented as an application executing on a computer system that is accessed by NOC personnel using one or more NOC workstations.

The incident reporting application (or system) 118 can monitor the alarms stored in the data store 120 and automatically generate incident reports on these alarms based in part on the alarm configurations created and maintained by the alarms configuration system 110. For example, an alarm configuration rule defined by the alarm configuration system 110 may indicate that an incident report is not to be opened related to a specific alarm until the alarm has been active for a predefined period of time, for example for five minutes, for ten minutes, for fifteen minutes, for twenty minutes, for twenty-five minutes, or some other period of time less than two hours. The time criteria for auto generation of incident reports may be useful to avoid opening and tracking incidents that are automatically resolved by other components of the network 100, as described further hereinafter. Incident reports may be referred to in some contexts or by other communication service providers as tickets or trouble tickets.

The incident management application 114 may operate upon incident reports in a sequence of processes. In an embodiment, the incident management application 114 may perform automated triage on incident reports that includes automated enrichment of alarms and/or incident reports, automated dispatch to field operations personnel for some incident reports, and automated testing. Automated enrichment may comprise looking-up relevant information from a plurality of disparate sources and attaching this relevant information to the incident report. The looked-up information may comprise local environmental information such as weather reports, rainfall amounts, temperature, wind. The looked-up information may comprise logs of recent maintenance activities at the affected NE.

The automated triage process may involve determining a probable root cause for the incident and adding this to the incident report during the enrichment action. The probable root causes may be categorized as related to electric power, backhaul (e.g., transport), maintenance, or equipment (e.g., RAN hardware related), but within these general categories it is understood there may be a plurality of more precise probable root causes. The automated triage process can assign an incident report to personnel for handling based on its determination of the probable root cause of the incident report.

In an embodiment, the incident management application 114 may automatically close an incident report when NE status warrants such automated closure. Automated closure may happen because NOC personnel have taken manual corrective action to restore proper function of one or more NEs. Automated closure may happen because the incident management application 114 determines that the incident report was created pursuant to a maintenance action that extended beyond the scheduled maintenance interval and that the scheduled maintenance interval was later extended, but extended after a related incident report had already been generated. The incident management application 114 may perform automated remediation of alarm conditions associated with incident reports. For example, cell sites can be reset to restore operation and clear alarmed conditions. For example, cell sites can be locked and unlocked to restore operation and clear alarmed conditions. For example, cell sites may be resynched with GPS. For example, a software or firmware update may be pushed to cell sites.

In an embodiment, the incident management system in the communication network 100 may be enhanced to throttle alarms at the alarm management system 123 when the alarms are detected as repeatedly self-resolving beyond a threshold criteria, as described herein. To this end, the alarm management system 123 may further include a throttle application 127 and a data store 129. The data store 129 may be a local memory across one or more computers of the alarm management system 123. For example, the data store 129 may be a short-term memory or cache. Alternatively, the data store 129 may be a long-term memory or any other type of memory that may store the alarms 130 (e.g., data received in the alarms 130 from the NEs in the RAN 102).

The throttle application 127 may determine whether to throttle specific types of alarms 130 received from a NE based on a comparison between an alarm parameter 136 and a threshold for the NE/type of alarm 130, as described herein. The alarm parameter 136 may be based on various factors, such as, for example, a quantity/rate of alarms 130 received by the NE within a period of time, a quantity of the alarms 130 that have self-resolved within the period of time, etc. The threshold may be predefined for the NE and/or type of alarm, or may be dynamic based on, for example, a rate of all types of alarms 130 being received from the NE compared to a rate of the specific type of alarm 130 that is self-resolving after being received from the NE.

The throttle application 127 may determine to throttle specific types of alarms 130 from a NE for a throttle period when the alarm parameter 136 is greater than the threshold. Throttling the alarms 130 may refer to storing/caching the alarms 130 at the data store 129, as opposed to immediately forwarding the alarms 130 to the OSSs 104. The throttle period may be a period of time during which the throttle application 127 throttles alarms 130 of the specific type received from the NE. For example, the throttle period may be set to a default period of 1 hour, or may be dynamically determined based on various factors, such as, a network impact of the alarm 130, a quantity of the alarms 130 being received from the NE within a predefined time period, a quantity of the alarms 130 that have self-resolved within the predefined time period, etc.

Figure 2A:
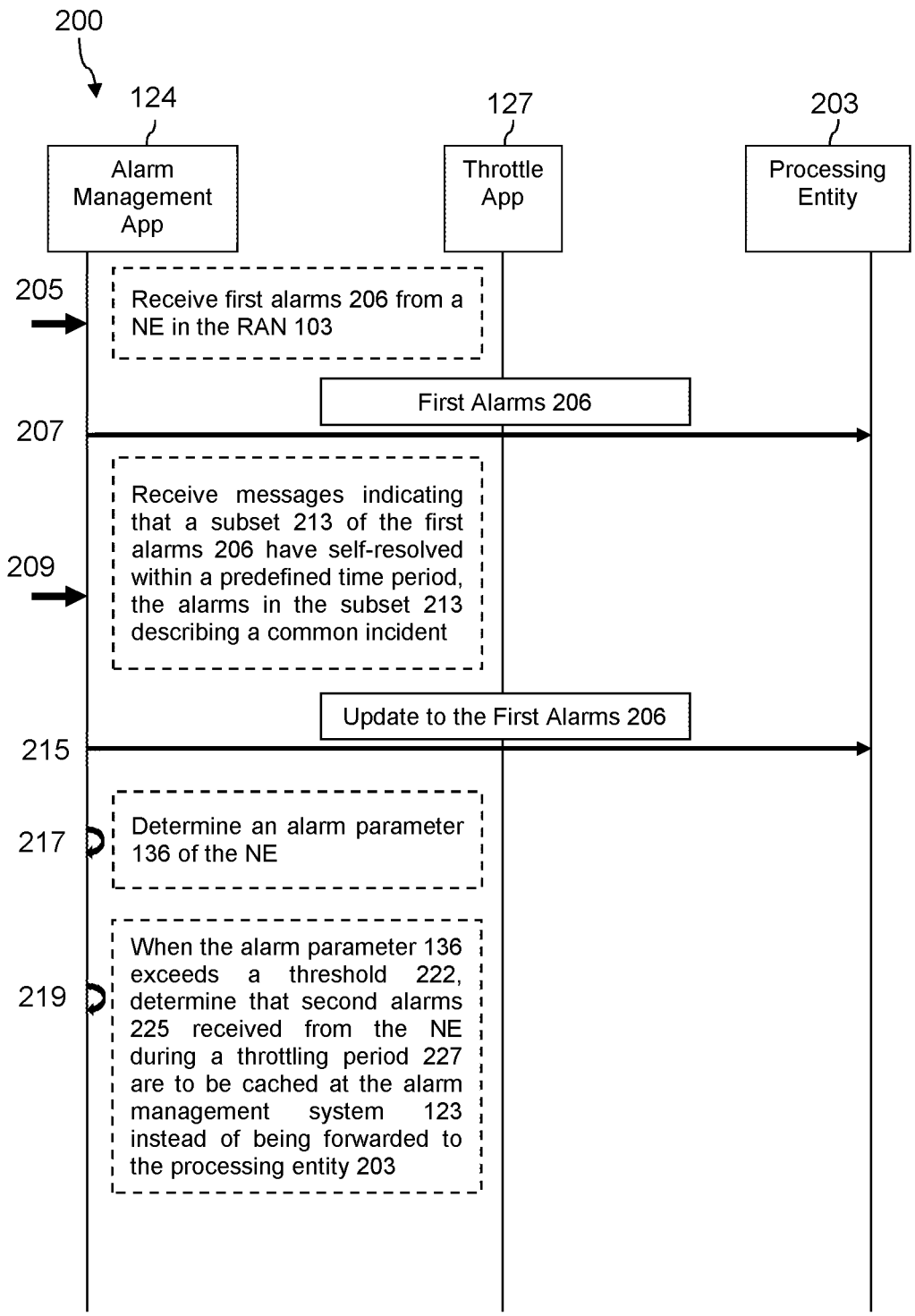
FIG. 2A, FIG. 2B, and FIG. 2C are message sequence diagrams illustrating communications between components in the communication network of FIG. 1 to dynamically throttle alarms according to various embodiments of the disclosure.
Figure 2B:
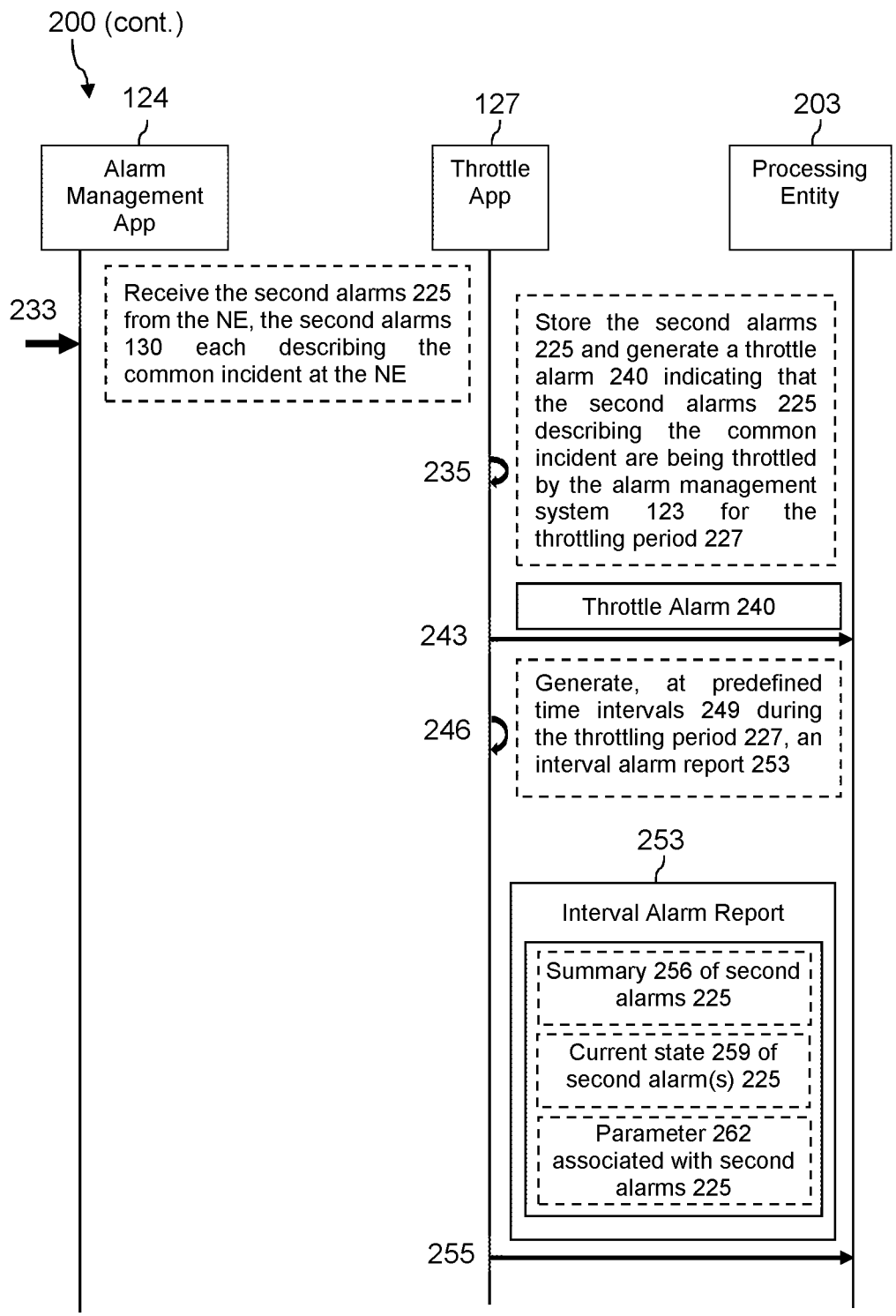
Figure 2C:
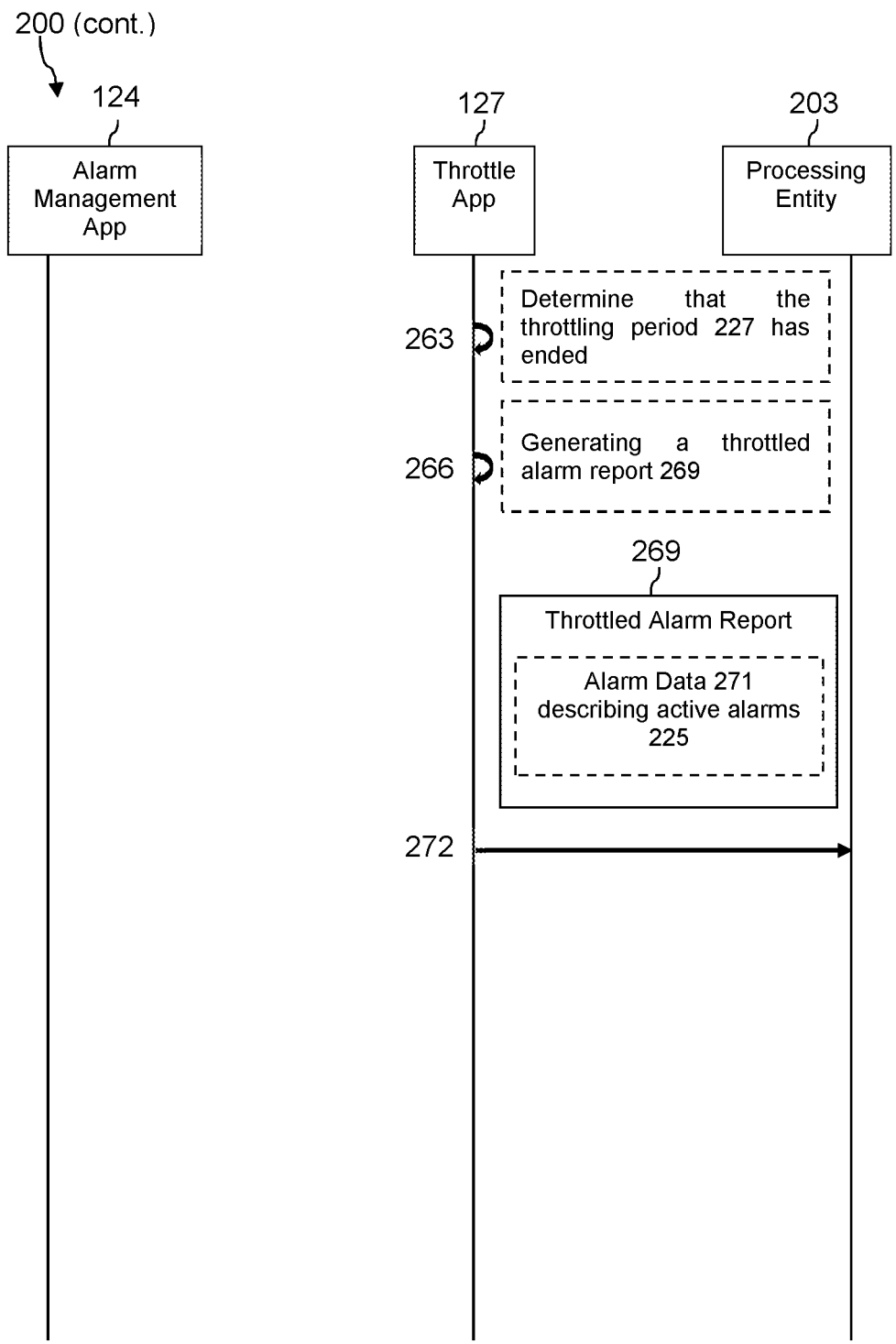

When the throttle application 127 determines that alarms 130 are to be throttled for a throttle period instead of immediately forwarded to the OSSs 104, the throttle application 127 may enrich (e.g., add other data) to the alarms 130 when storing the alarms 130 in the data store 129. For example, the throttle application 127 may enrich the alarms 130 with throttle data 133 and the alarm parameter 137. The throttle data 133 may include, for example, the throttle period, the rate/quantity of the alarms 130 being received from the NE within a predefined time period, the rate/quantity quantity of the alarms 130 that have self-resolved within the predefined time period, etc. The throttle data 133 may also include other data related to the alarm 130 or the throttling of the alarm 130, such as, for example, a description of the common incident triggering the alarms 130, a timestamp of the alarms 130, a timestamp of throttling the alarm 130, etc. Turning now to FIGS. 2A-C, shown are message sequence diagrams illustrating communications between the alarm management application 124, the throttle application 127, and a processing entity 203. The processing entity 203 may be, for example, the incident reporting application 118, the automated alarms handling system 112, a NOC personnel operating the NOC dashboard, and/or a maintenance technician or personnel.

Turning now to FIG. 2A, shown is a message sequence diagram 200 illustrating a first part of a method performed by the alarm management application 124, the throttle application 127, and the processing entity 203. The method may begin with step 205, in which the alarm management application 124 may receive first alarms 206 from a NE in the RAN 102. The first alarms 206 may be received from one or more NEs and may describe one or more incidents occurring across the one or more NEs.

At step 207, the alarm management application 124 may forward the first alarms 206 to the processing entity 203 for creation of an incident report corresponding to each alarm and to resolve the incident. As mentioned above, the alarm management application 124 may be programmed to perform certain pre-processing operations on the alarms 130 and then immediately forward the alarms 130 to the processing entity 203 via the OSSs 104.

At step 209, the alarm management application 124 may also receive messages from the same NE indicating that at least a subset 213 of the first alarms 206 have self-resolved without intervention from the processing entity 203 within a predefined period of time (e.g., 60 seconds). The first alarms 206 in the subset 213 may all be received from the same NE in the RAN 102 and may all describe a common incident at the NE. At step 215, the alarm management application 124 may transmit an update regarding each of the first alarms 206 in the subset 213 to the processing entity 203, in which the update indicates data describing not only the first alarm 130 but also the self-resolution of the alarm. For example, the update may include data describing the nature of the incident, the location of the incident (e.g., an identifier or address of the NE), a timestamp of the incident, a severity level of the incident, and other descriptions of the incident, along with an indication that the incident self-resolved, and/or any change in a parameter (e.g., severity or priority) of the first alarm 130. The processing entity 203 may use the update to determine whether to drop/discard a corresponding incident report detailing the incident or instruct the NOC/maintenance technician to take a certain action based on the update.

In an embodiment, the alarm management application 124 may obtain data regarding the alarms and messages received at steps 205 and 209 to determine various metrics regarding the self-resolutions of the first alarms 206, to determine an alarm parameter 136 of the NE. The alarm parameter 136 may be a value representing a self-resolution state of the NE with respect to a specific type of alarm, such that the value may be compared to a threshold to determine whether the type of alarm is to be throttled by the alarm management system 123.

To this end, at step 217, the alarm management application 124 may determine a quantity of the first alarms 206 received by the NE within a period of time based on the first alarms 206 received at step 205, and then determine a quantity of the subset 213 of the first alarms 206 that have self-resolved within the same period of time based on the messages received at step 209. As used herein, the term "self-resolved first alarms" may also refer to the subset 213 of the first alarms 206 that have self-resolved. The alarm management application 124 may use the determined quantities to determine a rate of first alarms 206 received from the NE within the period of time and a rate of self-resolved first alarms 206 (e.g., first alarms 206 in the subset 213) received from the NE within the period of time.

At step 217, the alarm management application 124 may determine the alarm parameter 136 based on the determined quantities and/or rates. For example, the alarm parameter 136 may be a ratio or proportion of the rate of self-resolved first alarms to the rate of first alarms 206 received from the NE in the period of time. The alarm parameter 136 may also be a ratio or proportion of the quantity of self-resolved first alarms to the quantity of first alarms 206 received from the NE in the period of time.

The alarm management application 124 may then compare the alarm parameter 136 with a threshold 222 defined for the type of self-resolved alarms and/or the NE. The threshold 222 may be a value or percentage based on various factors, such as, for example, the determined quantities and rates, the period of time, the type of alarms that are self-resolved, the common incident, a network impact of the incident, etc. For example, the threshold 222 may be set to a lower percentage when the network impact of the NE repeatedly going in and out of alarm state is high and causes, for an example, period outages at the NE. The threshold 222 may also be set to a lower percentage if the predefined period of time during which the first alarms 206 are received and analyzed is relatively long (e.g., a few hours or days).

The threshold 222 may also be set to a default percentage or proportion. For example, the threshold 222 may be set to 50 percent (%).

For example, the alarm parameter 136 may be a percentage of the rate of self-resolved first alarms to the rate of first alarms 206 received from the NE, and the threshold 222 may also be a percentage. In this case, the alarm management application 124 may compare the alarm parameter 136 percentage with the threshold 222 percentage. At step 219, when the alarm parameter 136 exceeds the threshold 222, the alarm management application 124 may determine that second alarms 225 (sometimes referred to herein as "new alarms") received from the NE during a throttle period 227 are to be throttled (e.g., stored or cached) in a data store 129 of the alarm management system 123 instead of being immediately forwarded to the processing entity 203 via the OSSs 104. The second alarms 225 may all be received from the same NE in the RAN 102 and may all describe a common incident at the NE, and thus, the second alarms 225 may be the same type of alarm as the first alarms 206 included in the subset 213 that are self-resolved first alarms. In other words, the second alarms 225 that are to be throttled have a history of self-resolving within the predefined period of time to an extent that exceeded a threshold parameter. The throttle period 227 may be a period of time or duration during which the second alarms 225 are throttled at the alarm management system 123 instead of being immediately forwarded to the processing entity 203. The alarm management application 124 may determine the throttle period 227 based on various factors, such as, for example, the determined quantities and rates, the predefined period of time, the type of alarms that are self-resolved, the common incident, the network impact of the incident and/or throttle the alarms, etc. For example, the alarm management application 124 may dynamically determine the throttle period 227 based on an average of self-resolved second alarms 225 received per second, which may be transposed as a duration into minutes as the throttle period 227. The throttle period 227 may also be set to a default period of time (e.g., at least one hour).

Turning now to FIG. 2B, shown is a continuation of the message sequence diagram 200 illustrating a second part of a method performed by the alarm management application 124, the throttle application 127, and the processing entity 203. At step 233, during the throttle period 227, the alarm management application 124 may receive the second alarms 225 from the NE. The throttle application 127 may then initiate throttling of the second alarms 225 based on, for example, examining all of the alarms coming into the alarm management system 123, and determining the second alarms 225 that are from the NE and that of the type (e.g., describing the incident and having a history of being self-resolved) determined to be throttled. The throttle application 127 may identify second alarms 225 being received at the alarm management system 123 that are to be throttled instead of being immediately forwarded to the processing entity 203. At step 235, the throttle application 127 may store the second alarms 225 in the data store 129 at least for the throttle time period. Each of the stored second alarms 225 may include, for example, an identifier or address of the NE from which the second alarm 225 was received, a rate of the second alarm 225 occurrence at the NE, a rate of self-resolution of the second alarm 225 at the NE, a condition of the second alarm 225, a priority of the second alarm 225, a severity of the second alarm 225, an incident triggering the second alarm 225, etc. The throttle application 127 may also enrich the second alarms 225 stored in the data store 129 by adding, to the second alarms 225, throttle data 133 describing, for example, the throttle period 227, alarm parameter 136, the threshold 222, the determined quantities and rates described above, and/or any other data related to the second alarms 225. The throttle application 127 may store the enriched second alarms 225 in the data store 129.

At step 235, the throttle application 127 may also then generate a throttle alarm 240 indicating that the second alarms 225 received from the NE and having a history of being self-resolved are being throttled instead of forwarded for the throttle period 227. At step 243, the throttle application 127 may then send the throttle alarm 240 to the processing entity 203, for the processing entity 203 to be aware that certain types of second alarms 225 are being throttled because the second alarms 225 have had a history of repeatedly self-resolving.

During the throttle period 227, the throttle application 127 may monitor the second alarms 225 being received from the NE to identify any changes to the state 259 of the second alarms 225 (i.e., whether the second alarm 225 changes from an active, currently alarming state 259 to a temporarily or permanently resolved state 259, or whether the second alarm 225 changes from a temporarily resolved state 259 to an active currently alarming state 259). Each of these state 259 changes may be recorded in the data store 129 as throttle data 133, along with a timestamp of the state 259 change. Similarly, during the throttle period 227, the throttle application 127 may monitor the second alarms 225 being received from the NE to identify any changes to the parameters 262 of the second alarms 225 (i.e., whether a priority of the second alarm 225 changed, whether a severity of the second alarm 225 changed, whether incident data describing the incident data changed, etc.) Each of the parameter 262 changes may also be recorded in the data store 129 as throttle data 133, along with a timestamp of the parameter 262 change.

At step 246, the throttle application 127 may also periodically generate, for example, at predefined time intervals 249 during the throttle period 227, an interval alarm report. For example, the predefined time intervals 249 may occur every few minutes (e.g., 2, 3, or 5 minutes) during the throttle period 227. The interval alarm report 253 may include information describing the second alarms 225 being stored at the data store 129. For example, the interval alarm report 253 may include a summary 256 of the second alarms 225, a current state 259 of each of the second alarms 225 (e.g., active alarm state or resolved state), a parameter 262 associated with the second alarms 225 (e.g., a priority or severity of the throttled alarm). The summary 256 of the second alarms 225 may include summarized data describing the second alarms 225, such as, for example, only a timestamp of receiving a second alarm 225 and/or a timestamp of receiving a message that the second alarm 225 has self-resolved. The summary 256 may include a quantity of second alarm 225 self-resolutions during the predefined time interval 249. In some cases, the summary 256 may not include incident data describing the incident giving rise to the second alarm 225, since the incident data may have been provided in the throttle alarm 240. The current state 259 of each second alarm 225 may indicate, for example, whether each second alarm 225 received during the predefined time interval 249 is currently active (e.g., still alarming at the NE) or self-resolved, sometimes only for a short period of time (e.g., no longer still alarming at the NE). The parameter 262 associated with the second alarms 225 may indicate, for example, a change in a parameter 262 of the second alarm 225. For example, the parameter 262 may be a priority of the second alarm 225 or the severity of the second alarm 225.

The interval alarm report 253 may also describe trends that may be determined based on the second alarms 225. For example, the trends may indicate whether a rate of self-resolved second alarms 225 is decreasing or increasing over the predefined time interval(s) 249, whether a quantity of self-resolved second alarms 225 is decreasing or increasing over the predefined time interval(s) 249, whether the second alarm 225 seems to have actually self-resolved beyond a threshold period of time (e.g., when the incident appears to be fully resolved because the second alarm 225 is no longer being triggered), etc. At step 255, the throttle application 127 may forward the interval alarm report 253 to the processing entity 203.

The processing entity 203 may keep track of the data in the interval alarm report 253, store the data to a data store 120, and/or perform certain resolution tasks or actions at the NE if warranted. For example, the incident reporting application 118 may generate one or more incident reports based on the interval alarm report 253, in which the incident report may indicate that an issue is taking place at the NE that is resulting in the NE repeatedly triggering the second alarm 225 and then self-resolving relatively shortly afterwards. The incident report may include an indication that the incident report is based on an interval alarm report 253 generated for throttled second alarms 225.

Turning now to FIG. 20, shown is a continuation of the message sequence diagram 200 illustrating a third part of a method performed by the alarm management application 124, the throttle application 127, and the processing entity 203. The throttle application 127 may continue generating interval alarm reports at each predefined time interval until, for example, at step 263, the throttle application determines that the throttle period 227 has ended or terminated. If so, at step 266, the throttle application 127 may generate a throttled alarm report 269 comprising a more detailed overview of the throttled second alarms 225 over the course of the entire throttle period 227.

The throttled alarm report 269 may include various types of data, such as, for example, data regarding each throttled second alarm (e.g., timestamps of the second alarm 225 and the message regarding self-resolution of the second alarm 225, duration between the second alarm 225 and the message regarding self-resolution of the second alarm 225, incident data, etc.). In some cases, the throttled alarm report 269 may include minimal data regarding the second alarms 225 that appear to be fully resolved (i.e., the alarm management system 123 may no longer be receiving alarms and messages indicating a self-resolution of the second alarm 225). The throttled alarm report 269 may also include alarm data 271 specifically describing the second alarms 225 with a current state 259 of still active or pending (i.e., the second alarm 225 is still periodically being triggered at the NE and then self-resolved shortly afterwards). At step 272, the throttle application 127 may transmit the throttled alarm report 269 to the processing entity 203. The processing entity 203 may use the alarm data 271 in the throttled alarm report 269 to perform resolution tasks and actions at least with regard to the second alarms 225 that are currently still active and pending after the throttle period 227.

For example, the incident reporting application 118 may generate one or more incident reports based on the throttled alarm report 269. The incident report may include a flag or some other indication that the incident report is based on a throttled second alarm 225. In other words, the incident report may include an indication that the triggering second alarm 225 has a history of self-resolving, to an extent that the alarm was throttled for a throttle period 227. The incident report may be stored at the data store 120, such that the processing entity 203 (e.g., the incident management application 114, an automated system at the automated alarms handling system 112, a NOC operator operating a NOC dashboard, and/or a maintenance technician) may examine the incident report. The processing entity 203 may perform one or more resolutions or corrective actions at the NE to resolve or remediate the incident, such that the repeated instances of triggering the second alarm 225 that quickly self-resolves may terminate.

Figure 3:
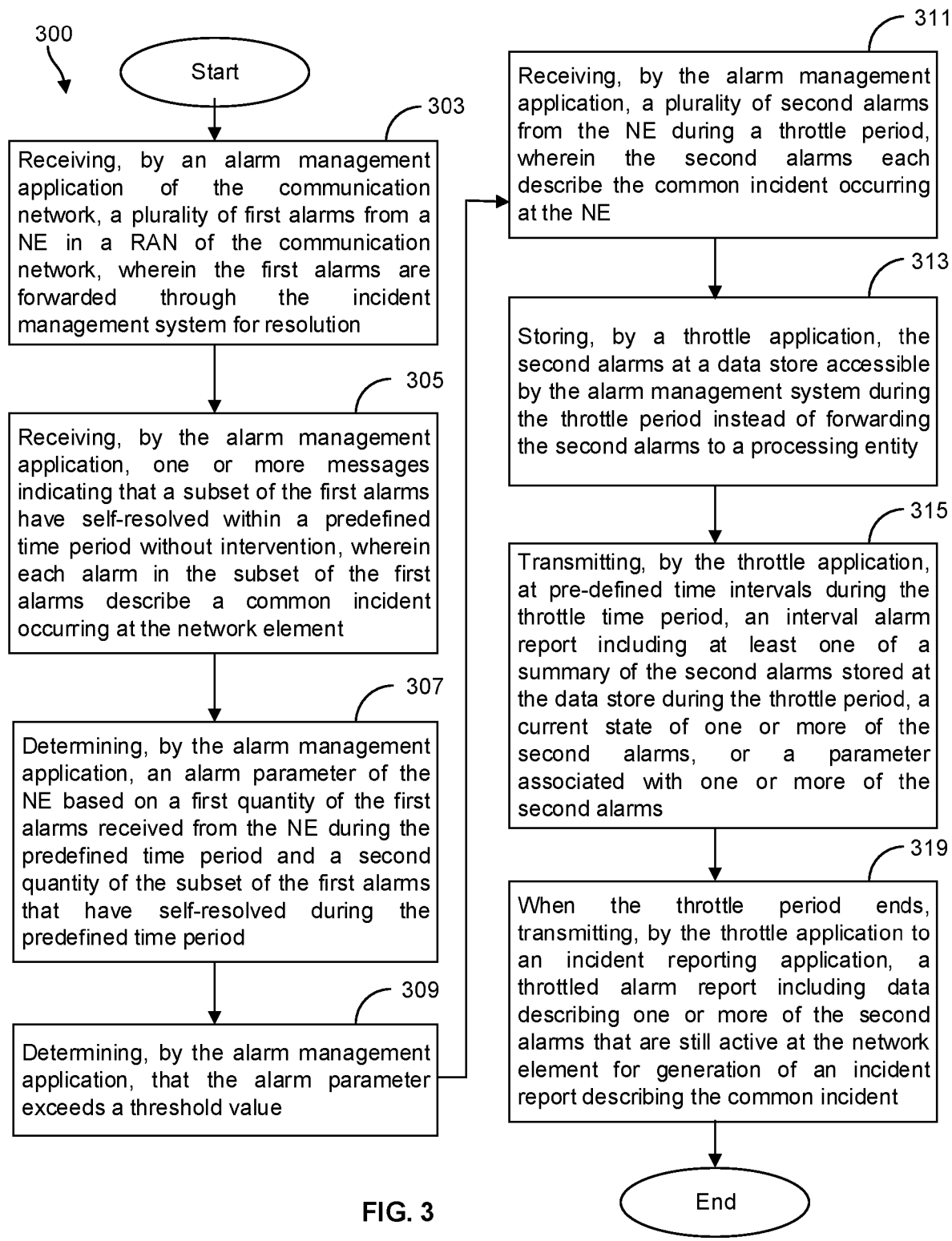
FIG. 3 is a flowchart of a method performed in the communication network according to an embodiment of the disclosure.

Turning now to FIG. 3, a method 300 for throttling alarms 130 received in an incident management system implemented in a communication network 100 is disclosed. The method 300 may be implemented by the alarm management application 124, a throttle application 127, and an incident reporting application 118. The method 300 may be implemented when first alarms 206 are received from a NE in the RAN 102.

At step 303, method 300 may comprise receiving, by an alarm management application 124 implemented by an alarm management system 123 of the communication network 100, a plurality of first alarms 206 from a NE in a RAN 102 of the communication network 100. The first alarms 206 are forwarded through the incident management system for resolution. For example, the alarm management system 123 may flow the first alarms 206 up to the processing entity 203 through the OSSs 104.

At step 305, method 300 may comprise receiving, by the alarm management application 124, one or more messages indicating that a subset 213 of the first alarms 206 have self-resolved within a predefined time period without intervention. In an embodiment, each alarm 130 in the subset 213 of the first alarms 206 describe a common incident occurring at the NE. At step 307, method 300 may comprise determining, by the alarm management application 124, an alarm parameter 136 of the NE based on a first quantity of the first alarms 206 received from the NE during the predefined period and a second quantity of the subset of the first alarms 206 that have self-resolved during the predefined time period.

At step 309, method 300 may comprise determining, by the alarm management system 123, that the alarm parameter 136 exceeds a threshold 222. At step 311, after determining that the alarm parameter 136 exceeds the threshold 222, method 300 may comprise receiving, by the alarm management application 124, a plurality of second alarms 225 from the NE during a throttle period 227. In an embodiment, the second alarms 225 each describe the common incident occurring at the NE. At step 313, method 300 may comprise storing, by a throttle application 127 implemented by the alarm management system 123, the second alarms 225 at a data store 129 accessible by the alarm management system 123 during the throttle period 227 instead of forwarding the second alarms 225 to a processing entity 203. At step 315, method 300 may comprise transmitting, by the throttle application 127, at pre-defined time intervals 249 during the throttle period 227, an interval alarm report 253 including at least one of a summary 256 of the second alarms 225 stored at the data store 129 during the throttle period 227, a current state 259 of one or more of the second alarms 225, or a parameter 262 associated with one or more of the second alarms 225.

At step 319, when the throttle period 227 ends, method 300 may comprise transmitting, by the throttle application 127 to an incident reporting application 118 implemented in an incident reporting system 117 of the communication network 100, a throttled alarm report 269. The throttled alarm report 269 may include data 271 describing one or more of the second alarms 225 that are still active at the NE for generation of an incident report describing the common incident. In an embodiment, method 300 may comprise instructing, by the incident reporting application 118, a corrective action to be performed at the network element in response to the throttled alarm report 269. The corrective action may include, for example, automatically performing one or more different types of reset operations of the affected NEs, reporting the throttled alarms and associated data to the NOC, reporting the throttled alarms and associated data directly to a maintenance technician and/or field technician, etc.

Method 300 may comprise other attributes and steps not otherwise shown in the flowchart of FIG. 3. In an embodiment, the threshold 222 is based on at least one of the first quantity of the first alarms 206 received from the NE, the second quantity of the subset 213 of the first alarms 206 that have self-resolved within the predefined time period, the predefined time period, or the common incident. Wherein after determining, by the alarm management application 124, that the alarm parameter 136 exceeds the threshold 222, the method 300 may further comprise transmitting, by the throttle application 127, a throttle alarm 240 to a network operations center (NOC) of the incident management system, wherein the throttle alarm 240 indicates that the second alarms 225 describing the common incident will be throttled at the alarm management system 123 for the throttle period 227. In an embodiment, prior to storing the second alarms 225 at the data store 129, the method further comprises adding throttle data 133 describing the throttle period 227 to each of the second alarms 225. In an embodiment, the parameter 262 associated with the one or more of the second alarms 225 comprises a priority of a second alarm 225. In an embodiment, wherein the current state 259 of the one or more second alarms 225 indicates whether the one or more second alarms 225 are in an active state or in a self-cleared state at a time of sending the interval alarm report 253.

In an embodiment, to determine the alarm parameter 136, method 300 may further comprise determining, by the alarm management application 124, a first rate of the first alarms 206 received from the NE during the predefined time period based on the first quantity of the first alarms 206 received from the NE during the predefined time period, and determining, by the alarm management application 124, a second rate of the subset 213 of the first alarms 206 that have self-resolved during the predefined time period based on the second quantity of the subset 213 of the first alarms 206 that have self-resolved during the predefined time period. In an embodiment, the alarm parameter 136 is a ratio of the second quantity to the first quantity.

Figure 4:
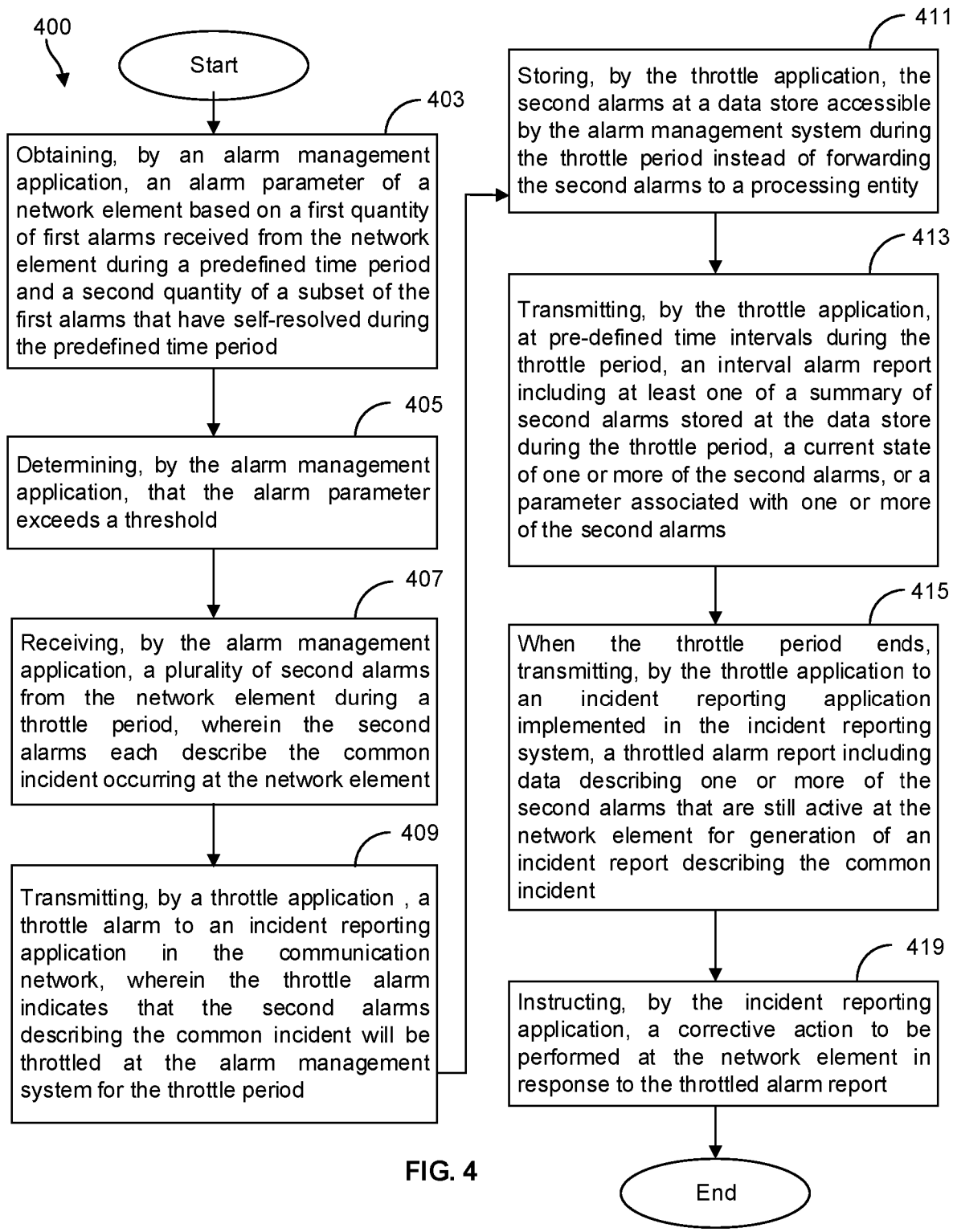
FIG. 4 is a flowchart of another method according to an embodiment of the disclosure.

Turning now to FIG. 4, a method 400 is described. The method 400 may be implemented by the alarm management application 124, a throttle application 127, and an incident reporting application 118. The method 400 may be implemented when first alarms 206 are received from a NE in the RAN 102.

At step 403, method 400 may comprise obtaining, by an alarm management application 124 implemented by an alarm management system 123 of the communication network 100, an alarm parameter 136 of a NE in a RAN 102 based on a first quantity of the first alarms 206 received from the NE during a first time period and a second quantity of the subset 213 of the first alarms 206 that have self-resolved during the first time period. At step 405, method 400 may comprise determining, by the alarm management system 123, that the alarm parameter 136 exceeds a threshold 222.

At step 407, after determining that the alarm parameter 136 exceeds the threshold 222, method 400 may comprise receiving, by the alarm management application 124, a plurality of second alarms 225 from the NE during a throttle period 227. In an embodiment, the second alarms 225 each describe the common incident occurring at the NE.

At step 409, method 400 may comprise transmitting, by a throttle application 127 implemented by the alarm management system 123, a throttle alarm 240 to an incident reporting application 118 in the communication network 100. The throttle alarm 240 may indicate that the second alarms 225 describing the common incident will be throttled at the alarm management system 123 for the throttle period 227. At step 411, method 400 may comprise storing, by the throttle application 127, the second alarms 225 at a data store 129 accessible by the alarm management system 123 during the throttle period 227 instead of forwarding the second alarms 225 to a processing entity 203. At step 413, method 400 may comprise transmitting, by the throttle application 127, at pre-defined time intervals 249 during the throttle period 227, an interval alarm report 253 including at least one of a summary 256 of the second alarms 225 stored at the data store 129 during the throttle period 227, a current state 259 of one or more of the second alarms 225, or a parameter 262 associated with one or more of the second alarms 225.

At step 415, when the throttle period 227 ends, method 400 may comprise transmitting, by the throttle application 127 to an incident reporting application 118 implemented in an incident reporting system 117 of the communication network 100, a throttled alarm report 269. The throttled alarm report 269 may include data 271 describing one or more of the second alarms 225 that are still active at the NE for generation of an incident report describing the common incident. At step 419, method 400 may comprise instructing, by the incident reporting application 118, a corrective action to be performed at the network element in response to the throttled alarm report 269. The corrective action may include, for example, automatically performing one or more different types of reset operations of the affected NEs, reporting the throttled alarms and associated data to the NOC, reporting the throttled alarms and associated data directly to a maintenance technician and/or field technician, etc.

Method 400 may comprise other attributes and steps not otherwise shown in the flowchart of FIG. 4. In an embodiment, method 400 may further comprise receiving, by the alarm management application 124, the first alarms 206 from the NE, wherein the first alarms 206 are forwarded through the incident management system for resolution, and receiving, by the alarm management application 124, one or more messages indicating that a subset 213 of the first alarms 206 have self-resolved within the first time period without intervention. In an embodiment, the first time period is 60 seconds. In an embodiment, the throttle period 227 is at least one hour. In an embodiment, the threshold 222 is based on at least one of the first quantity of the first alarms 206 received from the NE, the second quantity of a subset 213 of the first alarms 206 received from the NE that have self-resolved within the first time period, the first time period, or the common incident.

In an embodiment, to determine the alarm parameter 136, method 400 may further comprise determining, by the alarm management application 124, a first rate of the first alarms 206 received from the NE during the predefined time period based on the first quantity of the first alarms 206 received from the NE during the predefined time period, and determining, by the alarm management application 124, a second rate of the subset 213 of the first alarms 206 that have self-resolved during the predefined time period based on the second quantity of the subset 213 of the first alarms 206 that have self-resolved during the predefined time period. In an embodiment, the alarm parameter 136 is a ratio of the second quantity to the first quantity.

Figure 5A:
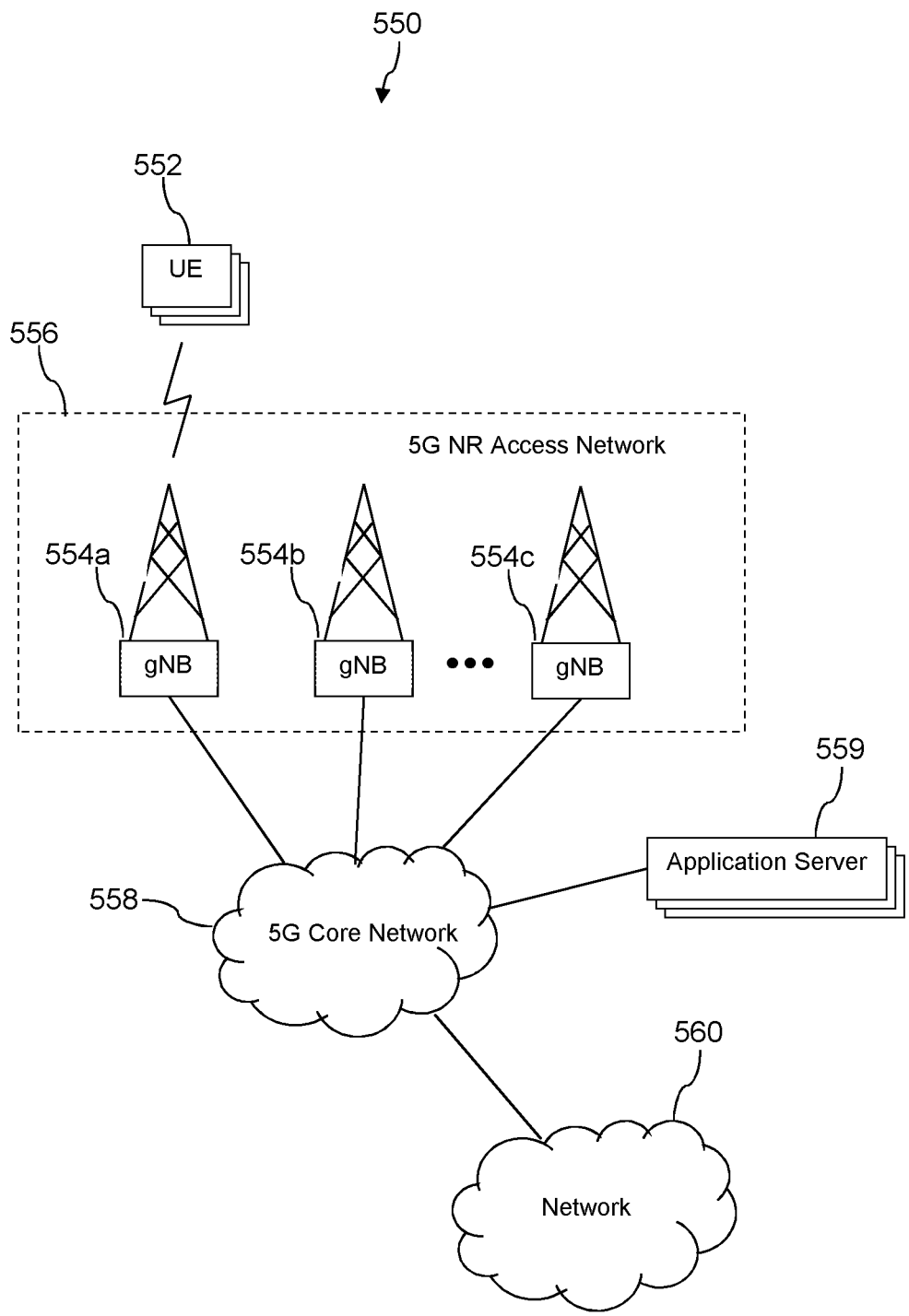
FIG. 5A and FIG. 5B are block diagrams of a 5G network according to an embodiment of the disclosure.

Turning now to FIG. 5A, an exemplary communication system 550 is described, similar to the communication network 100. Typically, the communication system 550 includes a number of access nodes 554 that are configured to provide coverage in which UEs 552 such as cell phones, tablet computers, machine-type-communication devices, tracking devices, embedded wireless modules, and/or other wirelessly equipped communication devices (whether or not user operated), can operate. The access nodes 554 may be said to establish an access network 556. The access network 556 may be referred to as a radio access network (RAN) in some contexts. In a 5G technology generation an access node 554 may be referred to as a next Generation Node B (gNB). In 4G technology (e.g., long term evolution (LTE) technology) an access node 554 may be referred to as an evolved Node B (eNB). In 3G technology (e.g., code division multiple access (CDMA) and global system for mobile communication (GSM)) an access node 554 may be referred to as a base transceiver station (BTS) combined with a base station controller (BSC). In some contexts, the access node 554 may be referred to as a cell site or a cell tower. In some implementations, a picocell may provide some of the functionality of an access node 554, albeit with a constrained coverage area. Each of these different embodiments of an access node 554 may be considered to provide roughly similar functions in the different technology generations.

In an embodiment, the access network 556 comprises a first access node 554a, a second access node 554b, and a third access node 554c. It is understood that the access network 556 may include any number of access nodes 554. Further, each access node 554 could be coupled with a core network 558 that provides connectivity with various application servers 559 and/or a network 560. In an embodiment, at least some of the application servers 559 may be located close to the network edge (e.g., geographically close to the UE 552 and the end user) to deliver so-called "edge computing." The network 560 may be one or more private networks, one or more public networks, or a combination thereof. The network 560 may comprise the public switched telephone network (PSTN). The network 560 may comprise the Internet. With this arrangement, a UE 552 within coverage of the access network 556 could engage in air-interface communication with an access node 554 and could thereby communicate via the access node 554 with various application servers and other entities.

The communication system 550 could operate in accordance with a particular radio access technology (RAT), with communications from an access node 554 to UEs 552 defining a downlink or forward link and communications from the UEs 552 to the access node 554 defining an uplink or reverse link. Over the years, the industry has developed various generations of RATs, in a continuous effort to increase available data rate and quality of service for end users. These generations have ranged from "1G," which used simple analog frequency modulation to facilitate basic voice-call service, to "4G"-such as Long Term Evolution (LTE), which now facilitates mobile broadband service using technologies such as orthogonal frequency division multiplexing (OFDM) and multiple input multiple output (MIMO).

Recently, the industry has been exploring developments in "5G" and particularly "5G NR" (5G New Radio), which may use a scalable OFDM air interface, advanced channel coding, massive MIMO, beamforming, mobile mmWave (e.g., frequency bands above 24 GHz), and/or other features, to support higher data rates and countless applications, such as mission-critical services, enhanced mobile broadband, and massive Internet of Things (IoT). 5G is hoped to provide virtually unlimited bandwidth on demand, for example providing access on demand to as much as 20 gigabits per second (Gbps) downlink data throughput and as much as 10 Gbps uplink data throughput. Due to the increased bandwidth associated with 5G, it is expected that the new networks will serve, in addition to conventional cell phones, general internet service providers for laptops and desktop computers, competing with existing ISPs such as cable internet, and also will make possible new applications in internet of things (IoT) and machine to machine areas.

In accordance with the RAT, each access node 554 could provide service on one or more radio-frequency (RF) carriers, each of which could be frequency division duplex (FDD), with separate frequency channels for downlink and uplink communication, or time division duplex (TDD), with a single frequency channel multiplexed over time between downlink and uplink use. Each such frequency channel could be defined as a specific range of frequency (e.g., in radio-frequency (RF) spectrum) having a bandwidth and a center frequency and thus extending from a low-end frequency to a high-end frequency. Further, on the downlink and uplink channels, the coverage of each access node 554 could define an air interface configured in a specific manner to define physical resources for carrying information wirelessly between the access node 554 and UEs 552.

Without limitation, for instance, the air interface could be divided over time into frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval (TTI), the resource elements on the downlink and uplink could be grouped to define physical resource blocks (PRBs) that the access node could allocate as needed to carry data between the access node and served UEs 552.

In addition, certain resource elements on the example air interface could be reserved for special purposes. For instance, on the downlink, certain resource elements could be reserved to carry synchronization signals that UEs 552 could detect as an indication of the presence of coverage and to establish frame timing, other resource elements could be reserved to carry a reference signal that UEs 552 could measure in order to determine coverage strength, and still other resource elements could be reserved to carry other control signaling such as PRB-scheduling directives and acknowledgement messaging from the access node 554 to served UEs 552. And on the uplink, certain resource elements could be reserved to carry random access signaling from UEs 552 to the access node 554, and other resource elements could be reserved to carry other control signaling such as PRB-scheduling requests and acknowledgement signaling from UEs 552 to the access node 554.

The access node 554, in some instances, may be split functionally into a radio unit (RU), a distributed unit (DU), and a central unit (CU) where each of the RU, DU, and CU have distinctive roles to play in the access network 556. The RU provides radio functions. The DU provides L1 and L2 real-time scheduling functions; and the CU provides higher L2 and L3 non-real time scheduling. This split supports flexibility in deploying the DU and CU. The CU may be hosted in a regional cloud data center. The DU may be co-located with the RU, or the DU may be hosted in an edge cloud data center.

Figure 5B:
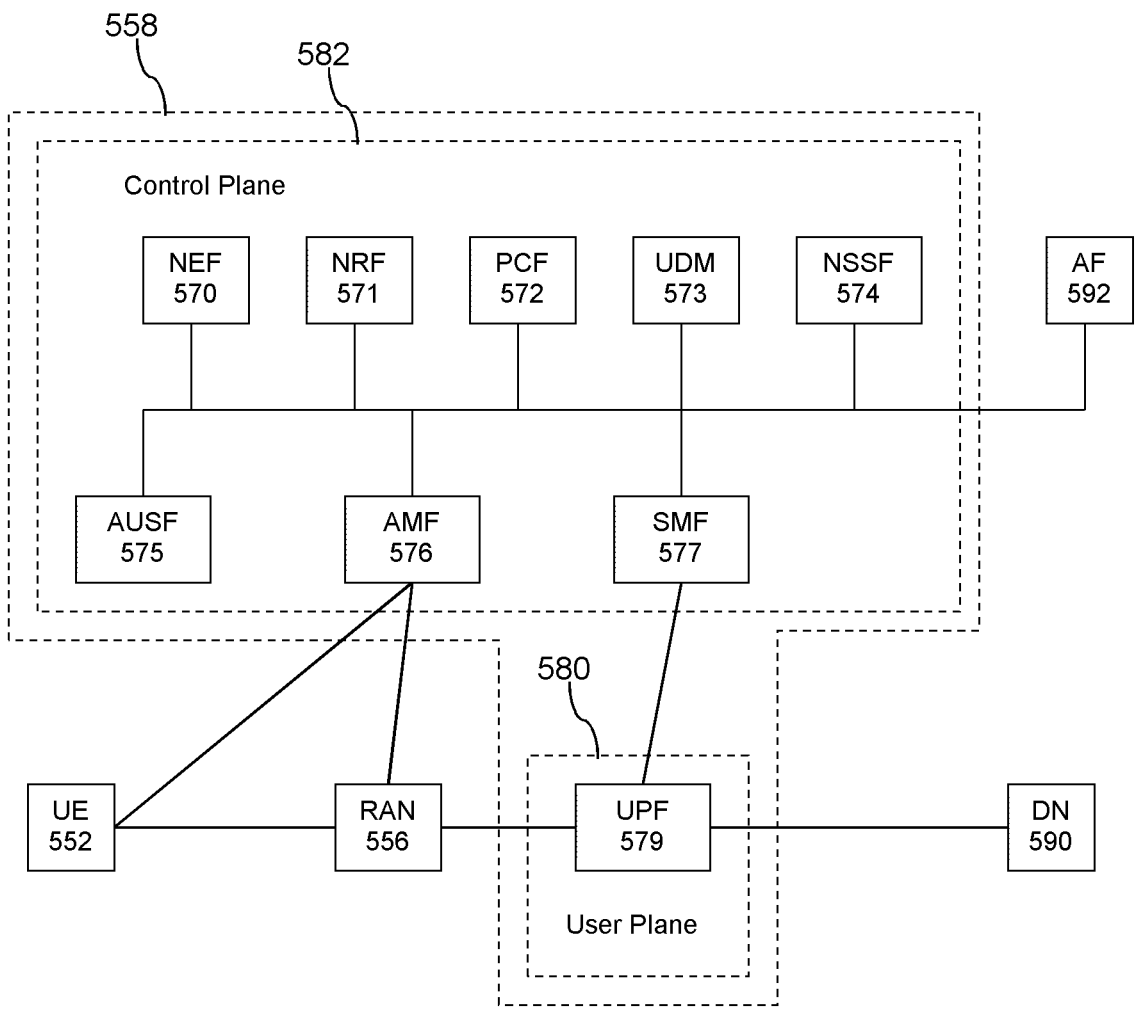

Turning now to FIG. 5B, further details of the core network 558 are described. In an embodiment, the core network 558 is a 5G core network. 5G core network technology is based on a service based architecture paradigm. Rather than constructing the 5G core network as a series of special purpose communication nodes (e.g., an HSS node, a MME node, etc.) running on dedicated server computers, the 5G core network is provided as a set of services or network functions. These services or network functions can be executed on virtual servers in a cloud computing environment which supports dynamic scaling and avoidance of long-term capital expenditures (fees for use may substitute for capital expenditures). These network functions can include, for example, a user plane function (UPF) 579, an authentication server function (AUSF) 575, an access and mobility management function (AMF) 576, a session management function (SMF) 577, a network exposure function (NEF) 570, a network repository function (NRF) 571, a policy control function (PCF) 572, a unified data management (UDM) 573, a network slice selection function (NSSF) 574, and other network functions. The network functions may be referred to as virtual network functions (VNFs) in some contexts.

Network functions may be formed by a combination of small pieces of software called microservices. Some microservices can be re-used in composing different network functions, thereby leveraging the utility of such microservices. Network functions may offer services to other network functions by extending application programming interfaces (APIs) to those other network functions that call their services via the APIs. The 5G core network 558 may be segregated into a user plane 580 and a control plane 582, thereby promoting independent scalability, evolution, and flexible deployment.

The UPF 579 delivers packet processing and links the UE 552, via the access network 556, to a data network 590 (e.g., the network 560 illustrated in FIG. 5A). The AMF 576 handles registration and connection management of non-access stratum (NAS) signaling with the UE 552. Said in other words, the AMF 576 manages UE registration and mobility issues. The AMF 576 manages reachability of the UEs 552 as well as various security issues. The SMF 577 handles session management issues. Specifically, the SMF 577 creates, updates, and removes (destroys) protocol data unit (PDU) sessions and manages the session context within the UPF 579. The SMF 577 decouples other control plane functions from user plane functions by performing dynamic host configuration protocol (DHCP) functions and IP address management functions. The AUSF 575 facilitates security processes.

The NEF 570 securely exposes the services and capabilities provided by network functions. The NRF 571 supports service registration by network functions and discovery of network functions by other network functions. The PCF 572 supports policy control decisions and flow based charging control. The UDM 573 manages network user data and can be paired with a user data repository (UDR) that stores user data such as customer profile information, customer authentication number, and encryption keys for the information. An application function 592, which may be located outside of the core network 558, exposes the application layer for interacting with the core network 558. In an embodiment, the application function 592 may be executed on an application server 559 located geographically proximate to the UE 552 in an "edge computing" deployment mode. The core network 558 can provide a network slice to a subscriber, for example an enterprise customer, that is composed of a plurality of 5G network functions that are configured to provide customized communication service for that subscriber, for example to provide communication service in accordance with communication policies defined by the customer. The NSSF 574 can help the AMF 576 to select the network slice instance (NSI) for use with the UE 552.

Figure 6:
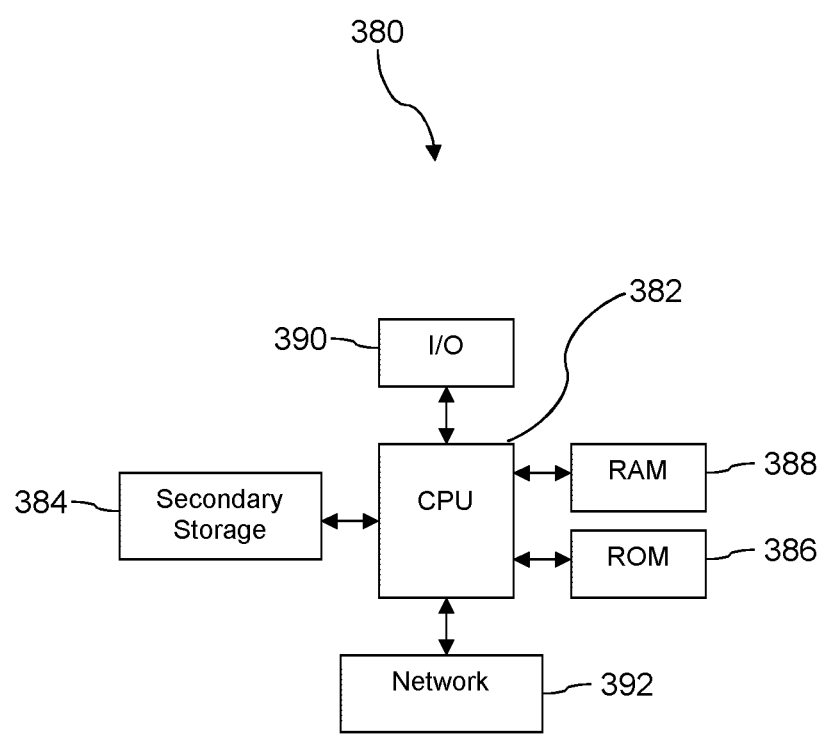
FIG. 6 is a block diagram of a computer system according to an embodiment of the disclosure.

FIG. 6 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC) and radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for throttling alarms received in an incident management system implemented in a communication network, wherein the method comprises:
   receiving, by an alarm management application implemented by an alarm management system of the communication network, a plurality of first alarms from a network element in a radio access network of the communication network, wherein the first alarms are forwarded through the incident management system for resolution;
   receiving, by the alarm management application, one or more messages indicating that a subset of the first alarms have self-resolved within a predefined time period without intervention, wherein each alarm in the subset of the first alarms describe a common incident occurring at the network element;
   determining, by the alarm management application, an alarm parameter of the network element based on a first quantity of the first alarms received from the network element during the predefined time period and a second quantity of the subset of the first alarms that have self-resolved during the predefined time period;
   after determining, by the alarm management application, that the alarm parameter exceeds a threshold value:
      receiving, by the alarm management application, a plurality of second alarms from the network element during a throttle period, wherein the second alarms each describe the common incident occurring at the network element;
      storing, by a throttle application implemented by the alarm management system, the second alarms at a data store accessible by the alarm management system during the throttle period instead of forwarding the second alarms to a processing entity; and
      transmitting, by the throttle application, at pre-defined time intervals during the throttle period, an interval alarm report including at least one of a summary of the second alarms stored at the data store during the throttle period, a current state of one or more of the second alarms, or a parameter associated with one or more of the second alarms; and
   when the throttle period ends, transmitting, by the throttle application to an incident reporting application implemented in an incident reporting system of the communication network, a throttled alarm report including data describing one or more of the second alarms that are still active at the network element for generation of an incident report describing the common incident.

2. The method of claim 1, wherein the threshold value is based on at least one of the first quantity of the first alarms received from the network element, the second quantity of the subset of the first alarms that have self-resolved within the predefined time period, the predefined time period, or the common incident.

3. The method of claim 1, wherein after determining, by the alarm management application, that the alarm parameter exceeds the threshold value, the method further comprises transmitting, by the throttle application, a throttle alarm to a network operations center (NOC) of the incident management system, wherein the throttle alarm indicates that the second alarms describing the common incident will be throttled at the alarm management system for the throttle period.

4. The method of claim 1, wherein prior to storing the second alarms at the data store, the method further comprises adding throttle data describing the throttle period to each of the second alarms.

5. The method of claim 1, wherein the parameter associated with the one or more of the second alarms comprises a priority of a second alarm.

6. The method of claim 1, wherein the current state of the one or more second alarms indicates whether the one or more second alarms are in an active state or in a self-cleared state at a time of sending the interval alarm report.

7. The method of claim 1, wherein determining the alarm parameter comprises:
   determining, by the alarm management application, a first rate of the first alarms received from the network element during the predefined time period based on the first quantity of the first alarms received from the network element during the predefined time period; and
   determining, by the alarm management application, a second rate of the subset of the first alarms that have self-resolved during the predefined time period based on the second quantity of the subset of the first alarms that have self-resolved during the predefined time period,
   wherein the alarm parameter is a ratio of the first rate to the second rate.

8. The method of claim 1, wherein the alarm parameter is a ratio of the second quantity to the first quantity.

9. A method for throttling alarms received in an incident management system implemented in a communication network, wherein the method comprises:
   obtaining, by an alarm management application implemented by an alarm management system of the communication network, an alarm parameter of a network element based on a first quantity of first alarms received from the network element during a predefined time period and a second quantity of a subset of the first alarms that have self-resolved during the predefined time period;
   after determining, by the alarm management application, that the alarm parameter exceeds a threshold value:
      receiving, by the alarm management application, a plurality of second alarms from the network element during a throttle period, wherein the second alarms each describe a common incident occurring at the network element;
      transmitting, by a throttle application implemented by the alarm management system, a throttle alarm to an incident reporting application implemented in an incident reporting system of the communication network, wherein the throttle alarm indicates that the second alarms describing the common incident will be throttled at the alarm management system for the throttle period;
      storing, by the throttle application, the second alarms at a data store accessible by the alarm management system during the throttle period instead of forwarding the second alarms to a processing entity; and
      transmitting, by the throttle application, at pre-defined time intervals during the throttle period, an interval alarm report including at least one of a summary of second alarms stored at the data store during the throttle period, a current state of one or more of the second alarms, or a parameter associated with one or more of the second alarms;
   when the throttle period ends, transmitting, by the throttle application to the incident reporting application implemented in the incident reporting system, a throttled alarm report including data describing one or more of the second alarms that are still active at the network element for generation of an incident report describing the common incident; and instructing, by the incident reporting application, a corrective action to be performed at the network element in response to the throttled alarm report.

10. The method of claim 9, wherein prior to obtaining the alarm parameter, the method further comprises:

receiving, by the alarm management application, the first alarms from the network element, wherein the first alarms are forwarded through the incident management system for resolution; and receiving, by the alarm management application, one or more messages indicating that a subset of the first alarms have self-resolved within the predefined time period without intervention.

11. The method of claim 10, wherein the predefined time period is 60 seconds.

12. The method of claim 9, wherein the throttle period is at least one hour.

13. The method of claim 9, wherein the threshold value is based on at least one of the first quantity of the first alarms received from the network element, the second quantity of the subset of the first alarms received from the network element that have self-resolved within the predefined time period, the predefined time period, or the common incident.

14. The method of claim 9, wherein determining the alarm parameter comprises:

determining, by the alarm management application, a first rate of the first alarms received from the network element during the predefined time period based on the first quantity of the first alarms received from the network element during the predefined time period; and determining, by the alarm management application, a second rate of the subset of the first alarms that have self-resolved during the predefined time period based on the second quantity of the subset of the first alarms that have self-resolved during the predefined time period, wherein the alarm parameter is a ratio of the first rate to the second rate.

15. A communication network comprising:

an alarm management system comprising:
one or more processors;
one or more non-transitory memories;
an alarm management application comprising instructions stored at the one or more non-transitory memories, which when executed by the one or more processors, causes the alarm management system to:
obtain an alarm parameter of a network element based on a first quantity of first alarms received from the network element during a predefined time period and a second quantity of a subset of the first alarms that have self-resolved during the predefined time period;
determine that the alarm parameter exceeds a threshold value; and
receive a plurality of second alarms from the network element during a throttle period, wherein the second alarms each describe a common incident occurring at the network element;

a throttle application comprising instructions stored at the one or more non-transitory memories, which when executed by the one or more processors, causes the alarm management system to:
transmit a throttle alarm to an incident reporting application implemented in an incident reporting system of the communication network, wherein the throttle alarm indicates that the second alarms describing the common incident are to be throttled at the alarm management system for the throttle period;
store the second alarms at a data store accessible by the alarm management system during the throttle period instead of forwarding the second alarms to a processing entity;
transmit at pre-defined time intervals during the throttle period, an interval alarm report including at least one of a summary of the second alarms stored at the data store during the throttle period, a current state of one or more of the second alarms, or a parameter associated with one or more of the second alarms; and
transmit, to the incident reporting application implemented in the incident reporting system, a throttled alarm report including data describing one or more of the second alarms that are still active at the network element for generation of an incident report describing the common incident.

16. The communication network of claim 15, wherein the alarm management application is further configured to:
receive the first alarms from the network element, wherein the first alarms are forwarded to the processing entity for resolution; and
receive one or more messages indicating that a subset of the first alarms have self-resolved within the predefined time period without intervention.

17. The communication network of claim 16, wherein the predefined time period is 60 seconds.

18. The communication network of claim 15, wherein the throttle period is at least one hour.

19. The communication network of claim 15, wherein the threshold value is based on at least one of the first quantity of the first alarms received from the network element, the second quantity of the subset of the first alarms received from the network element that have self-resolved within the predefined time period, the predefined time period, or the common incident.

20. The communication network of claim 15, wherein the alarm management application is further configured to:
determine a first rate of the first alarms received from the network element during the predefined time period based on the first quantity of the first alarms received from the network element during the predefined time period; and
determine a second rate of the subset of the first alarms that have self-resolved during the predefined time period based on the second quantity of the subset of the first alarms that have self-resolved during the predefined time period,
wherein the alarm parameter is a ratio of the first rate to the second rate.

* * * * *